US007487331B2

(12) United States Patent
Thomsen

(10) Patent No.: US 7,487,331 B2
(45) Date of Patent: Feb. 3, 2009

(54) PROGRAMMING A DIGITAL PROCESSOR WITH A SINGLE CONNECTION

(75) Inventor: Joseph Alan Thomsen, Gilbert, AZ (US)

(73) Assignee: Microchip Technology Incorprated, Chandler, AZ (US)

( * ) Notice: Subject to any disclaimer, the term of this patent is extended or adjusted under 35 U.S.C. 154(b) by 502 days.

(21) Appl. No.: 11/227,884

(22) Filed: Sep. 15, 2005

(65) Prior Publication Data

US 2007/0061524 A1 Mar. 15, 2007

(51) Int. Cl.
*G06F 9/308* (2006.01)

(52) U.S. Cl. ...................................... 712/200
(58) Field of Classification Search .................. 712/200
See application file for complete search history.

(56) References Cited

U.S. PATENT DOCUMENTS

| | | | |
|---|---|---|---|
| 5,050,194 A | | 9/1991 | Pickering et al. |
| 5,255,244 A | | 10/1993 | Dey |
| 5,307,348 A | * | 4/1994 | Buchholz et al. ............. 370/348 |
| 5,436,902 A | * | 7/1995 | McNamara et al. ......... 370/447 |
| 5,471,462 A | * | 11/1995 | Amador ....................... 370/252 |
| 5,706,115 A | * | 1/1998 | Hirayama et al. ........... 398/130 |
| 5,864,486 A | | 1/1999 | Deming et al. |
| 5,872,994 A | * | 2/1999 | Akiyama et al. ............... 712/43 |
| 6,055,578 A | * | 4/2000 | Williams et al. ............. 709/253 |
| 6,424,591 B1 | * | 7/2002 | Yu et al. ................ 365/230.09 |
| 6,581,113 B1 | * | 6/2003 | Dwork et al. ................. 710/52 |
| 6,662,314 B1 | * | 12/2003 | Iwata et al. .................... 714/42 |
| 6,735,657 B1 | | 5/2004 | Falk et al. |
| 2003/0188202 A1 | | 10/2003 | D'Angelo et al. |
| 2004/0049619 A1 | | 3/2004 | Lin |

OTHER PUBLICATIONS

International Search Report for PCT/US2006/035709 Mailed Feb. 22, 2007.
Sanders L.S., Pulse Codes in Serial Data Communications, Definitions of Some of the More Commonly Used Encoding Schemes, Along with an In-Depth Analysis of NRZ and Manchester Codes; Computer Design, Pennwell Publ Littleton, Massachusetts, U.S., vol. 21, No. 1, Jan. 1982, pp. 203-205, 208, 21, XP002054736, ISSN: 0010-4566, the whole document.

* cited by examiner

*Primary Examiner*—Eric Coleman
(74) *Attorney, Agent, or Firm*—Baker Botts L.L.P.

(57) ABSTRACT

A digital processor may be coupled to a processor programmer through a single conductor programming bus. The digital processor and the processor programmer, each may have a single programming connection (e.g., terminal, pin, etc.) coupled to the single conductor programming bus. The processor programmer may comprise an instruction encoder/decoder, a Manchester encoder, a Manchester decoder, a bus receiver and a bus transmitter. The bus receiver and bus transmitter may be coupled to the single connection that may be coupled to the single conductor programming bus. The instruction encoder/decoder may be coupled to a programming console, e.g., a personal computer, workstation, etc. The digital processor may comprise an instruction encoder/decoder, a Manchester encoder, a Manchester decoder, a bus receiver, a bus transmitter, a central processing unit (CPU), and a program memory. The bus receiver and bus transmitter may be coupled to the single connection, e.g., terminal, pin, ball, etc., on an integrated circuit package containing the digital processor. The single connection may be coupled to the single conductor programming bus. The instruction encoder/decoder may be coupled to the CPU and the program memory.

6 Claims, 1 Drawing Sheet

PROGRAMMING A DIGITAL PROCESSOR WITH A SINGLE CONNECTION

TECHNICAL FIELD

The present disclosure relates generally to programming of digital processors with embedded program memory, e.g., a microprocessor, a microcontroller, a digital signal processor (DSP), a programmable logic array (PLA), an application specific integrated circuit (ASIC) and the like, and, more particularly, to programming the digital processor through a single signal connection on an integrated circuit package containing the digital processor.

BACKGROUND

Integrated circuit digital processors, e.g., microprocessors, microcontrollers, digital signal processors (DSP), programmable logic array (PLA), application specific integrated circuit (ASIC) and the like, are becoming smaller and with fewer input-output (I/O) signal connections (e.g., pins) for both cost and space considerations. Typically, three or four connections may be used in programming the digital processor, e.g., JTAG uses four connections with at least one dedicated full time. One connection may be driven to a voltage above a normal operating voltage of that connection to signify that the digital processor should be in a programming mode. The other two connections may be used for data and a synchronous clock. By using one pin at a higher voltage during programming, other functions (non-programming) may also be associated with the programming pins, unless in system programming is desired.

SUMMARY

As smaller and smaller geometry integrated circuit fabrication processes are used to produce integrated circuit digital processors, these newer processes produce circuit elements that may not be able to withstand a high voltage without damage when used to signify a programming mode. What is needed is a way to program integrated circuit digital processors without requiring a high voltage for indicating a programming mode, and to further reduce the number of connections needed during the programming mode.

According to a specific example embodiment of this disclosure, a digital processor may comprise a central processing unit; a program memory coupled to the central processing unit; an instruction encoder/decoder coupled to the central processing unit and the program memory; a serial decoder coupled to the instruction encoder/decoder; a serial encoder coupled to the instruction encoder/decoder; a single bit bus receiver coupled to the serial decoder; a single bit bus transmitter coupled to the serial encoder; and a single bit programming connection coupled to the single bit bus receiver and transmitter; wherein program instructions are transferred into the program memory through the single bit programming connection. The digital processor may further comprise an integrated circuit package having a package connection coupled to the single bit programming connection.

According to another specific example embodiment of this disclosure, a method for programming a digital processor through a single bit connection may comprise the steps of: providing an instruction encoder/decoder coupled to a central processing unit and a program memory; providing a single bit serial decoder coupled to the instruction encoder/decoder; providing a single bit serial encoder coupled to the instruction encoder/decoder; providing a single bit bus receiver coupled to the single bit serial decoder and to a single bit programming connection; providing a single bit bus transmitter coupled to the single bit serial encoder and to the single bit programming connection; and transferring data into the program memory through the single bit programming connection by sending programming instructions to the processor instruction encoder/decoder.

According to yet another specific example embodiment of this disclosure, a system for programming a digital processor through a single bit connection may comprise a digital processor comprising a central processing unit; a program memory coupled to the central processing unit; a processor instruction encoder/decoder coupled to the central processing unit and the program memory; a processor serial decoder coupled to the processor instruction encoder/decoder; a processor serial encoder coupled to the processor instruction encoder/decoder; a processor single bit bus receiver coupled to the processor serial decoder; a processor single bit bus transmitter coupled to the processor serial encoder; and a processor single bit programming connection coupled to the processor single bit bus receiver and transmitter. The system also comprises a programmer that may comprise a programmer instruction encoder/decoder; a programmer serial decoder coupled to the programmer instruction encoder/decoder; a programmer serial encoder coupled to the programmer instruction encoder/decoder; a programmer single bit bus receiver coupled to the programmer serial decoder; a programmer single bit bus transmitter coupled to the programmer serial encoder; and a programmer single bit programming connection coupled to the programmer single bit bus receiver and transmitter; and a single bit bus coupling together the processor and programmer single bit programming connections; wherein the processor programmer causes the digital processor to enter into a programming mode by sending a plurality of alternating logic 1s and 0s for a certain time. The processor programmer may write data into the program memory over the single bit bus. The processor programmer may write data into the program memory over the single bit bus by sending programming instructions to the processor's instruction encoder/decoder. The processor programmer may read data from the program memory over the single bit bus. The processor and programmer single bit bus transmitters may be tri-state bus transmitters having active high and active low outputs.

BRIEF DESCRIPTION OF THE DRAWINGS

A more complete understanding of the present disclosure thereof may be acquired by referring to the following description taken in conjunction with the accompanying drawing, wherein.

Figure 1:
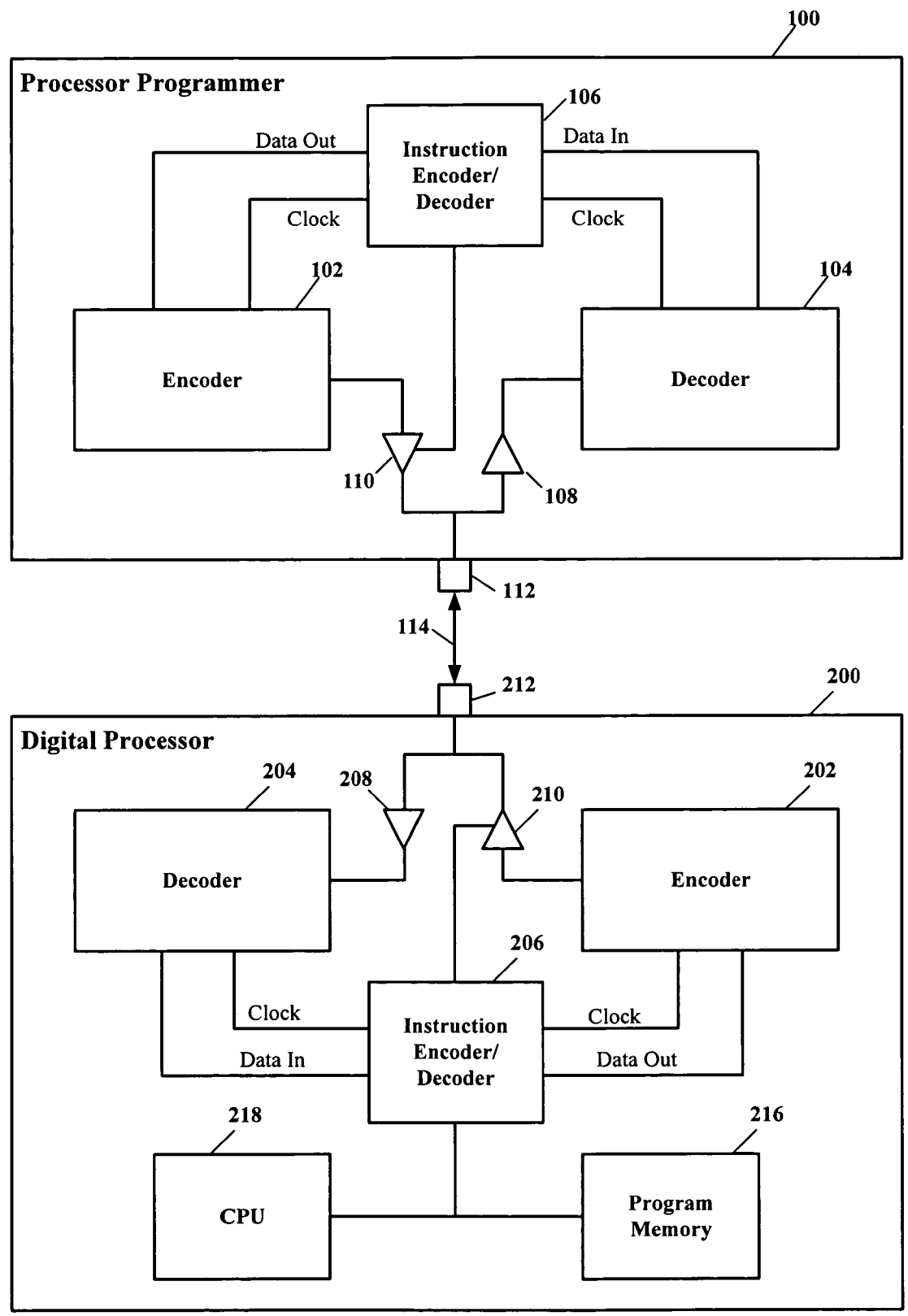
FIG. 1 illustrates a schematic block diagram of an integrated circuit digital processor and a processor programmer coupled together for programming of the digital processor, according to a specific example embodiment of the present disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

Referring now to the drawing, the details of specific example embodiments are schematically illustrated. Like elements in the drawings will be represented by like numbers, and similar elements will be represented by like numbers with a different lower case letter suffix.

Referring to FIG. 1, depicted is a schematic block diagram of an integrated circuit digital processor and a processor programmer coupled together for programming of the digital processor, according to a specific example embodiment of the present disclosure. A digital processor 202 may be coupled to a processor programmer 100 through a single conductor programming bus 114. The digital processor 202 and the processor programmer 100, each have a single programming connection (e.g., terminal, pin, etc.) 212 and 112, respectively, coupled to the single conductor programming bus 114.

The processor programmer 100 may comprise an instruction encoder/decoder 106, a encoder 102, a decoder 104, a bus receiver 108 and a bus transmitter 110. The bus receiver 108 and bus transmitter 110 may be coupled to the single connection 112 that may be coupled to the single conductor programming bus 114. The instruction encoder/decoder 106 may be coupled to a programming console (not shown) e.g., a personal computer, workstation, etc.

The digital processor 200 may comprise an instruction encoder/decoder 206, an encoder 202, a decoder 204, a bus receiver 208, a bus transmitter 210, a central processing unit (CPU) 218, and a program memory 216. The bus receiver 208 and bus transmitter 210 may be coupled to the single connection 212, e.g., connection, terminal, pin, ball, etc., on an integrated circuit package (not shown) containing the digital processor 200. The single connection 212 may be coupled to the single conductor programming bus 114. The instruction encoder/decoder 106 may be coupled to the CPU 218 and the program memory 216. The program memory 216 may be, for example but not limited to, electrically programmable read only memory (EPROM), electrically erasable and programmable read only memory (EEPROM), and FLASH memory. The encoders 102 and 202, and decoders 104 and 204 may use any serial protocol where a signal comprises both clock and data information, e.g., Manchester encoding.

Manchester encoding is a digital serial data encoding technique having a synchronous clock. A Manchester encoded data stream may be used to encode clock and data of a synchronous bit stream onto a single-wire (bit) bus. In Manchester encoding, the actual binary data to be transmitted over the single-wire bus is not sent as a sequence of logic 1's and 0's (technically known as Non Return to Zero (NRZ)). Instead in Manchester encoding the bits are translated into changes in logic levels. As examples, a logic 0 may be an upward transition at a bit center, e.g., logic 0 to logic 1 transition, and a logic 1 may be an downward transition at a bit center, e.g., logic 1 to logic 0 transition. The opposite logic level transitions may also be used to represent logic 1s and 0s in Manchester encoding.

A Manchester encoded signal contains a plurality of frequent level transitions that may allow the data receiver to extract a clock signal frequency from the transmitting device. For reliable clock frequency extraction, the transmitted bit stream should contain a high density of bit transitions. Manchester encoding has a high density of bit transitions that allows reliable extraction of the transmitting device clock frequency.

A programming mode for the digital processor 200 may be entered by the processor programmer 100 providing a string of logic 1s on the programming connection 212 of the digital processor 200 for a certain length of time. The digital processor 200 may then recognize that a programming mode is to be entered due to the string of logic 1s being received at the programming connection 212. The digital processor 200 may remain in the programming mode until a data stream, e.g., alternating logic 1s and 0s, on the single conductor programming bus 114 is no longer active for a certain period of time. A start header of the data stream comprising a string of logic 1s may also allow synchronization of an internal programming clock of the digital processor 200 with the programming clock of the processor programmer 100, e.g., Manchester encoding.

A command may be initiated with the transmission of a start bit (e.g., logic 0) followed by, for example, a programming command. At the end of the programming command a stop bit (e.g., logic 1) may be issued. If the programming command has data to be written to the program memory 216, the programming command may transmit a start bit, the data to be written in the program memory 216 and a stop bit. If the command requests data to be read, the processor programmer 100 may quit driving the single conductor programming bus 114, e.g., by putting the bus transmitter 110 output into a high impedance condition (tri-state). Then the digital processor 200 may drive the single conductor programming bus 114 with a start bit, the requested data and a stop bit. After the stop bit, the digital processor 200 may quit driving the single conductor programming bus 114, e.g., by putting the bus transmitter 210 output into a high impedance condition (tri-state). Then the processor programmer 100 may resume control of the programming commands. The processor programmer 100 may continue to drive encoded logic 1s on the single conductor programming bus 114 until another programming command is ready to be sent by the processor programmer 100. When all programming has been completed, e.g., program instructions, data and pointer values, etc., the encoded string of logic 1s from the processor programmer 100 may cease and after a certain time the digital processor 200 may recognize the lack of a string of logic 1s on the programming connection 212 indicates an exit from the programming mode and back to normal operation. Similarly, other command sequences may be used for any test modes that may be desired to be incorporated in the digital processor. Thus only one connection (e.g., connection 212) may be required for a wide range of programming and testing of the digital processor 200.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A system for programming a digital processor through a single bit connection, said system comprising:
   a digital processor comprising:
      a central processing unit;

a program memory coupled to the central processing unit;

a processor instruction encoder/decoder coupled to the central processing unit and the program memory;

a processor serial decoder coupled to the processor instruction encoder/decoder;

a processor serial encoder coupled to the processor instruction encoder/decoder;

a processor single bit bus receiver coupled to the processor serial decoder;

a processor single bit bus transmitter coupled to the processor serial encoder; and a processor single bit programming connection coupled to the processor single bit bus receiver and transmitter;

a programmer comprising:

a programmer instruction encoder/decoder;

a programmer serial decoder coupled to the programmer instruction encoder/decoder;

a programmer serial encoder coupled to the programmer instruction encoder/decoder;

a programmer single bit bus receiver coupled to the programmer serial decoder;

a programmer single bit bus transmitter coupled to the programmer serial encoder; and a programmer single bit programming connection coupled to the programmer single bit bus receiver and transmitter; and a single bit bus coupling together the processor and programmer single bit programming connections;

wherein the processor programmer causes the digital processor to enter into a programming mode by sending a unique data pattern for a certain time.

2. The system of according to claim 1, wherein the unique data pattern is plurality of alternating logic 1s and 0s.

3. The system of according to claim 1, wherein the processor programmer writes program instructions into the program memory over the single bit bus.

4. The system of according to claim 1, wherein the processor programmer writes data into the program memory over the single bit bus.

5. The system of according to claim 1, wherein the processor programmer reads data from the program memory over the single bit bus.

6. The system of according to claim 1, wherein the processor and programmer single bit bus transmitters are tri-state bus transmitters having active high and active low outputs.

* * * * *